US008202158B2

(12) United States Patent
Anderson et al.

(10) Patent No.: US 8,202,158 B2
(45) Date of Patent: Jun. 19, 2012

(54) APPARATUS TO PASS A VALUE BASED PARAMETER FOR A WAGERING GAME

(75) Inventors: Peter R. Anderson, Glenview, IL (US); Mark B. Gagner, West Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 164 days.

(21) Appl. No.: 12/514,426

(22) PCT Filed: Nov. 9, 2007

(86) PCT No.: PCT/US2007/023636

§ 371 (c)(1), (2), (4) Date: May 11, 2009

(87) PCT Pub. No.: WO2008/060459

PCT Pub. Date: May 22, 2008

(65) Prior Publication Data

US 2009/0291752 A1 Nov. 26, 2009

Related U.S. Application Data

(60) Provisional application No. 60/865,386, filed on Nov. 10, 2006.

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl. ................. 463/25; 463/16; 463/20; 463/42

(58) Field of Classification Search .................... 463/16, 463/20, 25, 42

See application file for complete search history.

(56) References Cited

U.S. PATENT DOCUMENTS

| | | | |
|---|---|---|---|
| 4,695,053 | A | 9/1987 | Vazquez et al. |
| 5,655,961 | A | 8/1997 | Acres et al. |
| 5,941,773 | A | 8/1999 | Harlick |
| 6,135,884 | A | 10/2000 | Hedrick et al. |
| 6,190,255 | B1 | 2/2001 | Thomas et al. |
| 6,203,429 | B1 | 3/2001 | Demar et al. |

(Continued)

FOREIGN PATENT DOCUMENTS

AU 2005251830 B2 12/2005

(Continued)

OTHER PUBLICATIONS

"International Application Serial No. PCT/US2007/023636, Search Report mailed Jun. 23, 2008.", 4 pgs.

(Continued)

*Primary Examiner* — Peter DungBa Vo
*Assistant Examiner* — Wei Li
(74) *Attorney, Agent, or Firm* — Schwegman, Lundberg & Woessner, P.A.

(57) ABSTRACT

Methods, apparatus and systems for accessing a bonus game with a wagering game machine are described. A portal module can be used to pass a desired expected value from a base wagering game to a portal bonus game module. The portal bonus game may use the desired expected value to generate bonus game payout frequencies and bonus game payout values. Wagering game machines according to the various embodiments of the invention are also disclosed.

23 Claims, 8 Drawing Sheets

U.S. PATENT DOCUMENTS 6,234,897 B1 5/2001 Frohm et al.
6,375,570 B1 4/2002 Poole
6,443,837 B1 9/2002 Jaffe et al.
RE37,885 E 10/2002 Acres et al.
6,561,900 B1 5/2003 Baerlocher et al.
6,565,436 B1 5/2003 Baerlocher
6,648,757 B1 11/2003 Slomiany et al.
6,860,810 B2 3/2005 Cannon et al.
RE38,812 E 10/2005 Acres et al.
6,960,134 B2 11/2005 Hartl et al.
7,144,321 B2 12/2006 Mayeroff
7,235,011 B2 6/2007 Randall et al.
7,278,919 B2 * 10/2007 Souza et al. .................... 463/25
7,285,049 B1 10/2007 Luciano, Jr. et al.
7,445,548 B1 11/2008 Muskin
7,722,453 B2 * 5/2010 Lark et al. ....................... 463/16
7,771,264 B2 8/2010 Kane et al.
7,914,377 B2 * 3/2011 Benbrahim et al. ............ 463/25
7,967,675 B1 6/2011 Delaney et al.
2001/0011797 A1 8/2001 Pierce et al.
2002/0025847 A1 * 2/2002 Thomas et al. ................. 463/20
2002/0039919 A1 4/2002 Joshi et al.
2002/0090990 A1 7/2002 Joshi et al.
2002/0142825 A1 * 10/2002 Lark et al. ....................... 463/16
2002/0175466 A1 11/2002 Loose et al.
2003/0036423 A1 * 2/2003 Vancura .......................... 463/20
2003/0060266 A1 3/2003 Baerlocher
2003/0060281 A1 3/2003 Vancura
2003/0114218 A1 6/2003 McClintic
2003/0153375 A1 8/2003 Vancura
2003/0176215 A1 9/2003 Palmer et al.
2003/0176220 A1 9/2003 Baerlocher
2004/0048655 A1 3/2004 Yoshioka
2004/0048657 A1 * 3/2004 Gauselmann ................... 463/25
2004/0092315 A1 5/2004 Boyd et al.
2004/0106446 A1 6/2004 Cannon et al.
2004/0166918 A1 8/2004 Walker et al.
2004/0185930 A1 9/2004 Thomas et al.
2004/0219969 A1 11/2004 Casey et al.
2005/0096121 A1 * 5/2005 Gilliland et al. ................ 463/20
2005/0159208 A1 7/2005 Pacey
2005/0159211 A1 * 7/2005 Englman ......................... 463/25
2005/0164765 A1 7/2005 Okuniewicz
2005/0170877 A1 8/2005 Okuniewicz
2005/0187004 A1 8/2005 Vancura
2005/0215311 A1 9/2005 Hornik et al.
2005/0250568 A1 11/2005 Kane et al.
2006/0014582 A1 1/2006 Harris et al.
2006/0025200 A1 2/2006 Van Asdale
2006/0035707 A1 2/2006 Nguyen et al.
2006/0046819 A1 3/2006 Nguyen et al.
2006/0073879 A1 4/2006 Baerlocher
2006/0073887 A1 4/2006 Nguyen et al.
2006/0073888 A1 4/2006 Nguyen et al.
2006/0073897 A1 4/2006 Englman et al.
2006/0089190 A1 4/2006 Bryant et al.
2006/0089195 A1 4/2006 Walker et al.
2006/0142079 A1 6/2006 Ikehara et al.
2006/0166733 A1 * 7/2006 Hettinger ........................ 463/25
2007/0060314 A1 3/2007 Baerlocher et al.
2007/0060321 A1 3/2007 Vasquez et al.
2007/0191088 A1 8/2007 Breckner et al.
2007/0218975 A1 9/2007 Iddings et al.
2007/0225065 A1 9/2007 Wright et al.
2007/0259709 A1 11/2007 Kelly et al.
2007/0293293 A1 12/2007 Baerlocher et al.
2007/0298857 A1 12/2007 Schlottmann et al.
2007/0298874 A1 12/2007 Baerlocher et al.
2007/0298875 A1 12/2007 Baerlocher et al.
2008/0020830 A1 1/2008 Ikehara et al.
2008/0020831 A1 1/2008 Ikehara et al.
2008/0020832 A1 1/2008 Iddings et al.
2008/0020833 A1 1/2008 Baerlocher et al.
2008/0020834 A1 1/2008 Breckner et al.
2008/0020846 A1 1/2008 Vasquez et al.
2008/0045344 A1 2/2008 Schlottmann et al.
2008/0064502 A1 3/2008 Schlottmann et al.
2008/0070680 A1 3/2008 Baerlocher et al.
2008/0070692 A1 3/2008 Schlottmann et al.
2008/0070693 A1 3/2008 Schlottmann et al.
2008/0070694 A1 3/2008 Schlottmann et al.
2008/0070695 A1 3/2008 Baerlocher et al.
2008/0076514 A1 3/2008 Baerlocher et al.
2008/0076515 A1 3/2008 Baerlocher et al.
2008/0076517 A1 3/2008 Baerlocher et al.
2008/0076552 A1 3/2008 Baerlocher et al.
2009/0305776 A1 12/2009 Englman et al.
2010/0029369 A1 2/2010 Pacey
2010/0048283 A1 2/2010 Anderson et al.
2010/0048293 A1 2/2010 Hornik
2010/0062841 A1 3/2010 Englman et al.

FOREIGN PATENT DOCUMENTS

EP 0945837 9/1999
EP 1453023 9/2004
EP 2086656 A2 8/2009
EP 2086656 A4 5/2011
WO WO-03006129 A1 1/2003
WO WO-03036423 A1 2/2003
WO WO-2005187004 A1 8/2005
WO WO-2006076185 A2 7/2006
WO WO-2008030904 A2 3/2008
WO WO-2008063408 A3 3/2008
WO WO-2008060426 A2 5/2008
WO WO-2008060426 A3 5/2008
WO WO-2008060429 A2 5/2008
WO WO-2008060429 A3 5/2008
WO WO-2008060442 A2 5/2008
WO WO-2008060442 A3 5/2008
WO WO-2008060442 C2 5/2008
WO WO-2008060513 A2 5/2008
WO WO-2008060513 A3 5/2008
WO WO-2008063408 A2 5/2008

OTHER PUBLICATIONS

"International Application Serial Appl. No. PCT/US2007/023636, Written Opinion mailed Jun. 23, 2008.", 7 pgs.
"Application Serial No, 12/514,421, Final Office Action mailed Jun. 2, 2011", 17 pgs.
"U.S. Appl. No. 12/513,974, Examiner Interview Summary mailed Apr. 22, 2011", 3 pgs.
"U.S. Appl. No. 12/513,974, Non Final Office Action mailed Feb. 2, 2011", 15 pgs.
"U.S. Appl. No. 12/513,974, Response filed May 2, 2011 to Non Final Office Action mailed Feb. 2, 2011", 11 pgs.
"U.S. Appl. No. 12/513,994, Non Final Office Action mailed Dec. 10, 2010", 10 pgs.
"U.S. Appl. No. 12/513,994, Response filed Apr. 11, 2011 to Non Final Office Action mailed Dec. 10, 2001", 10 pgs.
"U.S. Appl. No. 12/514,019, Examiner Interview Summary mailed Apr. 25, 2011", 4 pgs.
"U.S. Appl. No. 12/514,019, Non Final Office Action mailed Jan. 20, 2011", 9 pgs.
"U.S. Appl. No. 12/514,019, Response filed Apr. 2, 2011 to Non Final Office Action mailed Jan. 20, 2011", 12 pgs.
"U.S. Appl. No. 12/514,038, Non Final Office Action mailed Jan. 5, 2011", 10 pgs.
"U.S. Appl. No. 12/514,038, Response filed Apr. 5, 2011 to Non Final Office Action mailed Jan. 5, 2011", 10 pgs.
"U.S. Appl. No. 12/514,421 Non-Final Office Action mailed Oct. 8, 2010", 18 pgs.
"U.S. Appl. No. 12/514,421, Response filed Feb. 8, 2011 to Non Final Office Action mailed Oct. 8, 2011", 11 pgs.
"European Application Serial No. 07861814.7, Extended European Search Report mailed Nov. 26, 2010", 7 pgs.
"European Application Serial No. 07839999.5, Extended European Search Report mailed Apr. 6, 2011", 6 Pgs.
"International Application Serial No. PCT/US2007/023389, International Report on Patentability completed Nov. 16, 2010", 15 pgs.
"International Application Serial No. PCT/US2007/023389, International Search Report mailed May 9, 2008", 2 pgs.
"International Application Serial No. PCT/US2007/023389, International Written Opinion mailed May 9, 2008", 7 pgs.

"International Application Serial No. PCT/US2007/023499, International Report on Patentability, mailed Jul. 24, 2009", 7 pgs.
"International Application Serial No. PCT/US2007/023499, Search Report mailed Jul. 22, 2008", 2 pgs.
"International Application Serial No. PCT/US2007/023499, Written Opinion mailed Jul. 22, 2008", 7 pgs.
"International Application Serial No. PCT/US2007/023503, International Preliminary Report on Patentability, mailed mailed on Jul. 16, 2009".
"International Application Serial No. PCT/US2007/023503, Search Report mailed on Jul. 23, 2008", 2 pgs.
"International Application Serial No. PCT/US2007/023503, Written Opinion mailed on Jul. 23, 2008", 5 pgs.
"International Application Serial No. PCT/US2007/023572, International Preliminary Report on Patentability, mailed Jun. 18, 2009", 14 pgs.
"International Application Serial No. PCT/US2007/023572, International Search Report mailed May 9, 2008", 2 pgs.
"International Application Serial No. PCT/US2007/023572, International Written Opinion mailed May 9, 2008", 7 pgs.
"International Application Serial No. PCT/US2007/023636, International Report on Patentability mailed Jun. 18, 2009", 10 pgs.
"International Application Serial No. PCT/US2007/023753 Search Report mailed Jun. 23, 2008", 4 pgs.
"International Application Serial No. PCT/US2007/023753 Written Opinion mailed Jun. 23, 2008", 8 pgs.
"International Application Serial No. PCT/US2007/023753, International Report on Patentability mailed Jun. 18, 2009", 11 pgs.
"U.S. Appl. No. 12/513,974 , Response filed Sep. 27, 2011 to Final Office Action mailed Jun. 29, 2011", 17 pgs.
"U.S. Appl. No. 12/513,974, Final Office Action mailed Jun. 29, 2011", 26 pgs.
"U.S. Appl. No. 12/513,994 , Response filed Nov. 21, 2011 to Final Office Action mailed Jul. 21, 2011", 13 pgs.
"U.S. Appl. No. 12/513,994, Final Office Action mailed Jul. 21, 2011", 14 pgs.
"U.S. Appl. No. 12/514,019, Final Office Action mailed Jul. 21, 2011", 15 pgs.
"U.S. Appl. No. 12/514,038 , Response filed Dec. 13, 2011 to Non Final Office Action mailed Sep. 13, 2011", 14 pgs.
"U.S. Appl. No. 12/514,038, Examiner Interview Summary Mailed Dec. 13, 2011", 3 pgs.
"U.S. Appl. No. 12/514,038, Examiner Interview Summary Received Apr. 6, 2011", 3 pgs.
"U.S. Appl. No. 12/514,038, Final Office Action mailed Jun. 24, 2011", 11 pgs.
"U.S. Appl. No. 12/514,038, Non Final Office Action mailed Sep. 13, 2011", 12 pgs.
"U.S. Appl. No. 12/514,038, Response filed Aug. 24, 2011 to Final Office Action mailed Jun. 24, 2011", 12 pgs.
"U.S. Appl. No. 12/514,421. Response filed Sep. 30, 2011 to Final Office Action mailed Jun. 2, 2011", 16 pgs.
"Australian Application Serial No. 2007319884, Examiner Report Mailed Dec. 9, 2011", 2 pgs.
"Australian Application Serial No. 2007319923, Examiner Report mailed Dec. 19, 2011", 2 pgs.
"Australian Application Serial No. 2007319986, Examiner's Report mailed Dec. 7, 2011", 2 pgs.
"Australian Application Serial No. 2007320002, Examiner Report mailed Dec. 7, 2011", 2 pgs.

* cited by examiner

APPARATUS TO PASS A VALUE BASED PARAMETER FOR A WAGERING GAME

RELATED APPLICATION

This patent application is a U.S. National Stage Filing under 35 U.S.C. 371 from International Patent Application Serial No. PCT/US2007/023636, filed Nov. 9, 2007, and published on May 22, 2008, as WO 2008/060459 A2 and republished as WO 2008/060459 A3, which claims the priority benefit of U.S. Provisional Patent Application Ser. No. 60/865,386 filed Nov. 10, 2006 and entitled "APPARATUS TO PASS A VALUE BASED PARAMETER FOR A WAGERING GAME", the contents of which are incorporated herein by reference in their entirety.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2006, 2007, WMS Gaming, Inc.

FIELD

Embodiments of the inventive subject matter relate generally to wagering game systems.

BACKGROUND

Wagering game machine makers continually provide new and entertaining games. To keep a player entertained in repetitive wagering gaming content, a computerized wagering game may rely on the presentation of the game. One way of increasing entertainment value is to offer a variety of base wagering games and bonus wagering events. Consequently, there is a need to provide for seamless integration of bonus wager games with base wagering games to ensure an attractive gaming experience.

BRIEF DESCRIPTION OF THE FIGURES

Embodiments of the invention are illustrated by way of example and not limitation in the figures of the accompanying drawings in which.

DESCRIPTION OF THE EMBODIMENTS

Example Operating Environment

Example Wagering Game Machine Architecture

Different bonus games can have different expected values, which means that interchanging bonus games with the base wagering game can cause the expected value of a wagering game to change. The expected value of the bonus game can be passed to a portal module to ensure that the expected value of the wagering game does not change. The expected value passed to the portal module can be used by a bonus game selected by a player or a wagering game operator, to adjust the payout frequency or payout value of the selected bonus game. The portal modules described herein may be configured to allow any base wagering game to operate with any bonus game. As used herein, a modules may include any combination of software, firmware and/or hardware that logically or otherwise grouped for performing actions within a computerized system. As used herein, a portal is a gateway or path linking a base wagering game with a bonus game. Portal modules may include software, firmware and hardware to facilitate such linking.

Figure 1:
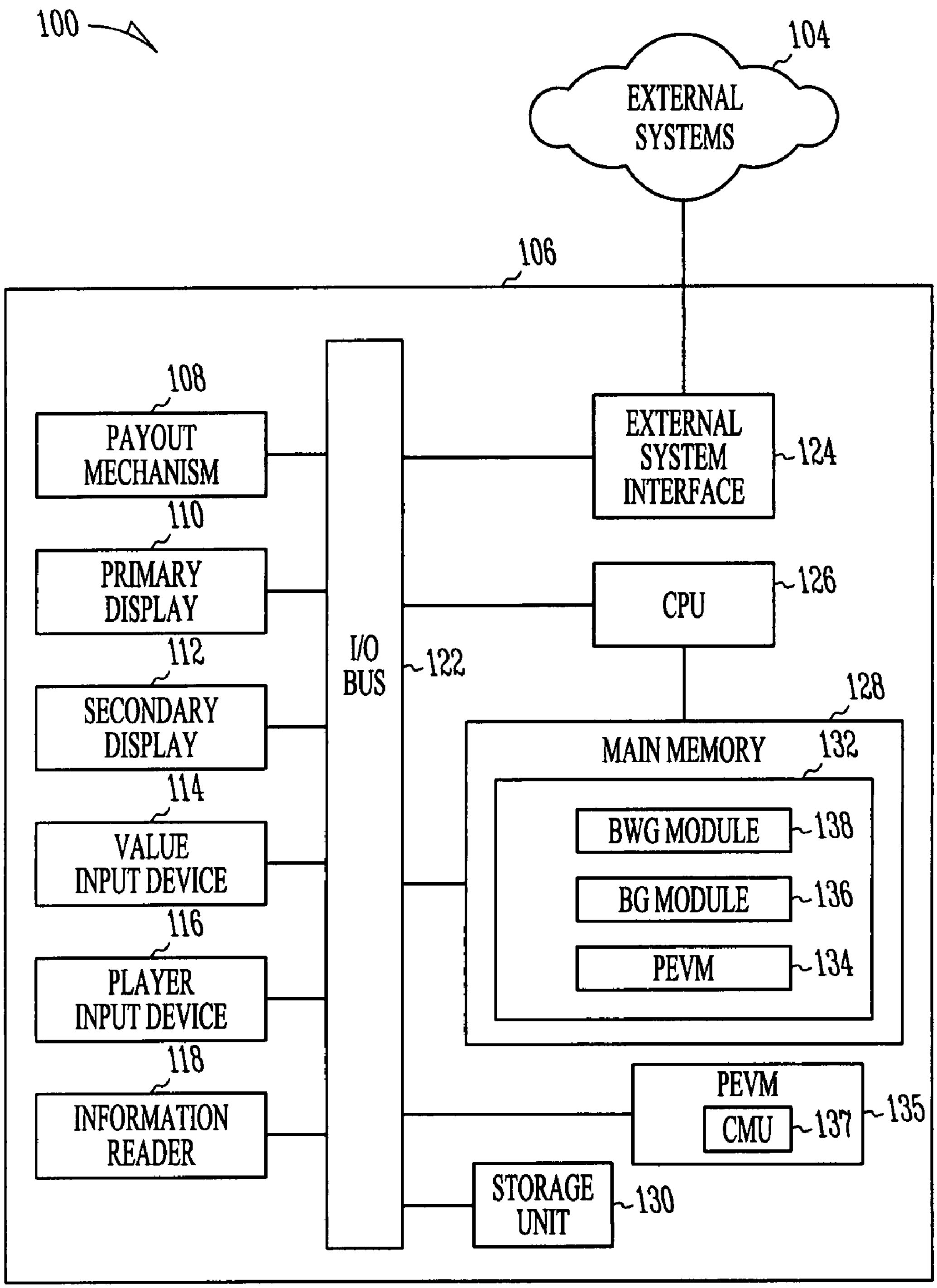
FIG. 1 is a block diagram illustrating a wagering game machine architecture according to example embodiments of the invention.

FIG. 1 is a block diagram illustrating a wagering game machine architecture 100 according to example embodiments of the invention. As shown in FIG. 1, the wagering game machine 106 includes a central processing unit (CPU) 126 connected to main memory 128, which includes a wagering game presentation unit 132. In one embodiment, the wagering game presentation unit 132 can present wagering games, such as video poker, video blackjack, video slots, video lottery, role playing games with wagering content etc., in whole or part. The wagering game presentation unit 132 can include a bonus game module 136 and a base wagering game module 138. The bonus game module 136 and the base wagering game module 138 can be further located in a portion of the main memory 128 separate the wagering game presentation unit 132, in a memory in a wagering game machine 106 separate from the main memory 128, or as one or more modules separate from the wagering game machine 106. The bonus game module 136 includes data for generating outcomes of the bonus game. Such data may include, but is not limited to, bonus game payout frequencies, bonus game average payout values, and expected values of bonus game wagers. The base wagering game module 138 includes data for generating outcomes of a base wagering game, such as the payout frequencies of a base wagering game, base wagering game payout values, and the expected value of base wagering game wagers. In an embodiment, the bonus game module 136 and the base wagering game module 138 are located outside the wagering game machine 106 and are coupled to a network device, such as a network server.

The wagering game presentation unit 132 can include a portal expected value module 134. In one embodiment, the portal expected value module 134 is located in a portion of the main memory 128 as a unit separate from the wagering game presentation unit 132. In another embodiment, the portal expected value module 134 is located in a memory unit in a wagering game machine 106 separate from the main memory 128. In another embodiment, the module 134 is located in a memory unit or as one or more modules separate from the wagering game machine 106. Examples of a portal expected value module that can be located in a memory unit include subroutine code, code libraries and application program interfaces such as interpreters utilizing Java EE™, Simple DirectMedia Layer™ (SDL) and DirectX™. A portal expected value module 135 can also be located as a unit separate from the main memory 128. Examples of a portal expected value module 135 include microprocessors, application specific integrated circuits, application specific standard products, field programmable gate arrays, complex programmable logic devices, programmable read only memories, electrically erasable programmable read only memories and other programmable logic devices. The portal expected value module 135 can further include subroutine code, code libraries and application program interfaces such as interpreters utilizing Java EE™, Simple DirectMedia Layer™ (SDL) and DirectX™. In another embodiment, the module 135 includes a processor and/or a memory unit 137. In another embodiment, the base wagering game machine 106 includes the portal expected value module 134 operatively coupled to the module 135 using an input/output (I/O) bus 122.

The portal expected value module 134/135 can be configured to receive data, such as expected values, from a bonus game module 136 and a base wagering game module 138, and use the data to generate an expected value for bonus game. In one embodiment, the module 134/135 can receive an expected value of a bonus game associated with a predetermined base wagering game.

The CPU 126 is also connected to I/O bus 122, which facilitates communication between the wagering game machine's components. The I/O bus 122 is connected to a payout mechanism 108, primary display 110, secondary display 112, value input device 114, player input device 116, information reader 118, and storage unit 130. The player input device 116 can include the value input device 114 to the extent the player input device 116 is used to place wagers. The I/O bus 122 is also connected to an external system interface 124, which is connected to external systems 104 (e.g., wagering game networks).

In one embodiment, the wagering game machine 106 can include additional peripheral devices and/or more than one of each component shown in FIG. 1. For example, in one embodiment, the wagering game machine 106 can include multiple external system interfaces 124 and multiple CPUs 126. In one embodiment, any of the components can be integrated or subdivided. Additionally, in one embodiment, the components of the wagering game machine 106 can be interconnected according to any suitable interconnection architecture (e.g., directly connected, hypercube, etc.).

In one embodiment, any of the components of the wagering game machine 106 (e.g., the wagering game presentation unit 132) can include hardware, firmware, and/or software for performing the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

Figure 2:
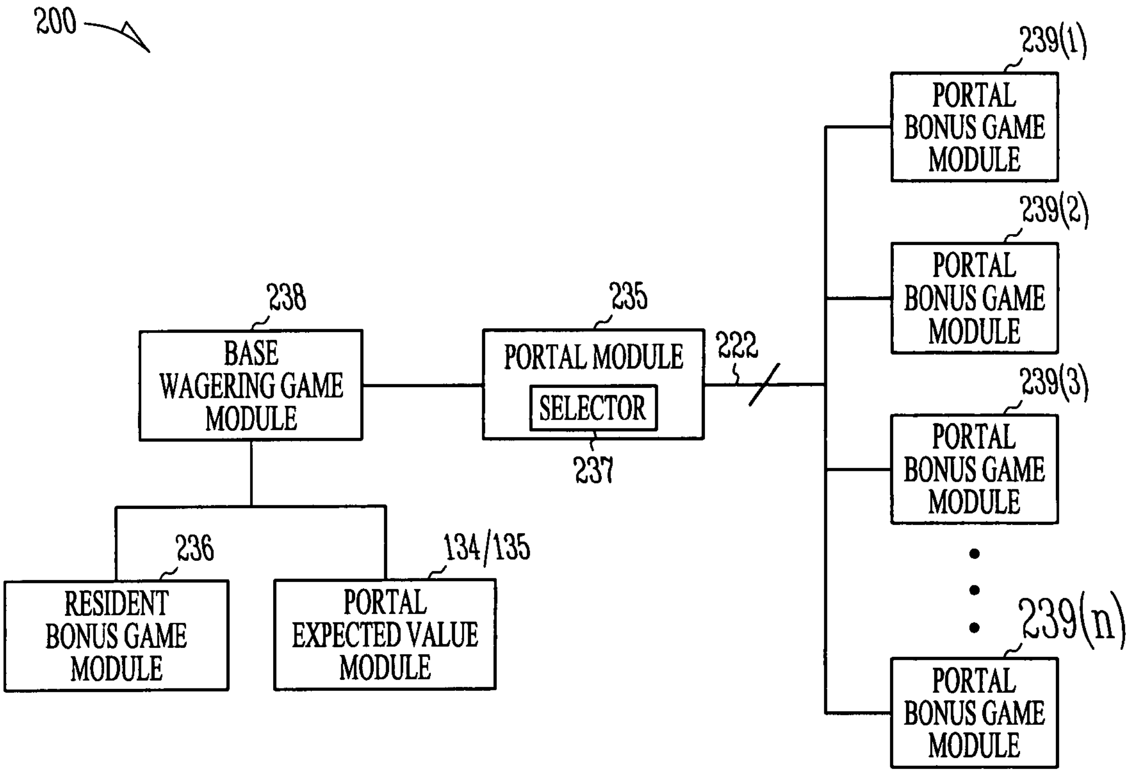
FIG. 2 is a block diagram of a wagering game architecture according to example embodiments of the invention.

FIG. 2 is a block diagram of a wagering game architecture 200 according to an example embodiment of the invention. In this embodiment, the wagering game architecture 200 includes a base wagering game module 238 operatively coupled to a resident bonus wagering game module 236 and to a portal module 235. A resident bonus game is a bonus game having its expected value contribution predetermined by the associated base wagering game. The resident bonus game module 236 includes information related to the resident bonus game, such as expected values, average payout frequencies and average payout values. The resident bonus game module 236 is configured to generate an expected value for the associated bonus game using a portal expected value module 134/135 and to provide the expected value to the base wagering game module 238. The bonus game expected value can be adjusted to match the desired expected value contribution to the base wagering game. The expected value of a wager of a base wagering game can be expressed by $$EV = \sum_{all\,x} (\text{frequency } (x) \times \text{Pay } (x)) / W,$$

where W is the value of the wager, frequency(x) is the frequency of occurrence of an event x, and Pay(x) is the payout value assigned to that event. In an embodiment, the wager requirement does not change and the expected value of the wager may be expressed as $$EV_T = EV_{BWG} + EV_{BG},$$

where $EV_{BWG}$ and $EV_{BG}$ are the expected values of the base wagering game and a bonus game, respectively. The expected value of a resident bonus game can be expressed as $$EV_{BGR} = \sum_{all\,y} (\text{frequency } (y) \times < \text{Pay } (y) >_{BGR},$$

where frequency(y) is the bonus game payout frequency for an event y, and $<Pay(y)>_{BGR}$ is the average bonus game payout value assigned to that event. The expected value, $EV_{BGR}$, is the desired portal expected value that can be passed to portal module 235. In some embodiments, the portal module 235 includes a portal expected value module such as module 134/135. In an embodiment, the bonus payout frequencies and the average bonus game payout values are passed to the portal module 235 to generate the desired portal expected value.

The portal module 235 can include subroutine code, code libraries and application program interfaces such as interpreters utilizing Java EE™, Simple DirectMedia Layer™ (SDL) and DirectX™ for carrying out one or more functions of the portal module 235, including operation of a bonus game selector 237. The portal module 235 can also include microprocessors, application specific integrated circuits, application specific standard products, field programmable gate arrays, complex programmable logic devices, programmable read only memories, electrically erasable programmable read only memories and other programmable logic devices for carrying out one or more functions, including operation of the bonus game selector 237.

The portal module 235 can pass the desired portal expected value to one of a plurality of portal bonus game modules 239(1)-239(*n*) that are coupled to the portal module 235 through the a transmission medium 222, such as a bus or a network. The portal bonus game modules 239(1)-239(*n*) include data for playing a bonus game. A portal bonus game module can further include software, firmware and hardware. The portal bonus game modules 239(1)-239(*n*) are modules configured to accept expected values from at least one portal module. The portal bonus game that can be accessed can be selected by a player or a wagering game operator. The selected portal bonus game module 239(1)-239(*n*) can accept the desired portal expected value from the portal module 235 and use desired portal expected value to generate pay tables corresponding to payout frequencies and/or payout values of the portal bonus game that match the desired portal expected value.

The portal module 235 can also include bonus game selector module 237. The bonus game selector module 237 can include a catalog of bonus games. Each bonus game in the catalog may include one or more tables of characteristics related to the bonus game. Such characteristics include the expected value of the bonus game, bonus game payout frequencies, and bonus game payout values. The catalog can also include one or more bonus game identifiers or tags for flagging and associating the bonus game with a base wagering game. In an embodiment, the expected values of the bonus game, one or more bonus game payout frequencies and/or one or more average bonus game payout values in the one or more tables can be used as the identifier of a bonus game. The catalog can include multiple instances of the same bonus game and multiple versions of a substantially equivalent bonus game. The catalog can also include an index of bonus games partitioned into expected values, average payout values and payout frequencies. The catalog can also include a hierarchical index of bonus games, for example, arranged in an order of expected values, average payout frequencies and average payout values.

The bonus game selector 237 can be configured to register new bonus games modules 239(*n*) as they are added. Using the catalog in the selector module 237, the base wagering game module 238 searches for available portal bonus game module 239(1)-239(*n*) upon the triggering of a bonus game. In one embodiment, the bonus game selector includes the portal bonus game modules 239(1)-239(*n*).

The bonus game selector 237 can be configured to permit a base wagering game module to select one or more bonus games upon triggering a bonus game event. In one embodiment, the base wagering game module transmits a search related signal to the portal module 235 or to the bonus game selector module 237 indicating that a bonus game has been awarded. The search signal can include data corresponding to a desired expected value that equals the expected value contribution of a bonus game to a base wagering game to obtain a predefined $EV_T$. In one embodiment the search signal includes data corresponding to a bonus game payout frequency and/or a bonus game average payout value. In another embodiment, the search signal is the desired expected value matching $E_{BWG}$ to $EV_T$. In another embodiment, the search signal is a payout frequency and/or an average payout value. In another embodiment, the search signal is a bonus game identifier set to the portal module 235 from the base wagering game module 238. Here, the base wagering game module 238 can include a selector module, such as module 237, containing a catalog or index of available bonus games. In such an embodiment, the base wagering game module 238 can send an identifier corresponding to a selection of one or more bonus games the base wagering game will accept. In one embodiment, the bonus game identifier passed to the portal module 235 and/or selector corresponds to a bonus game selected by the player. The selector module 237 then passes the desired expected value contribution to the portal bonus game modules 239(1)-239(*n*) selected for play. The appropriate portal bonus game can then be played.

Figure 3:
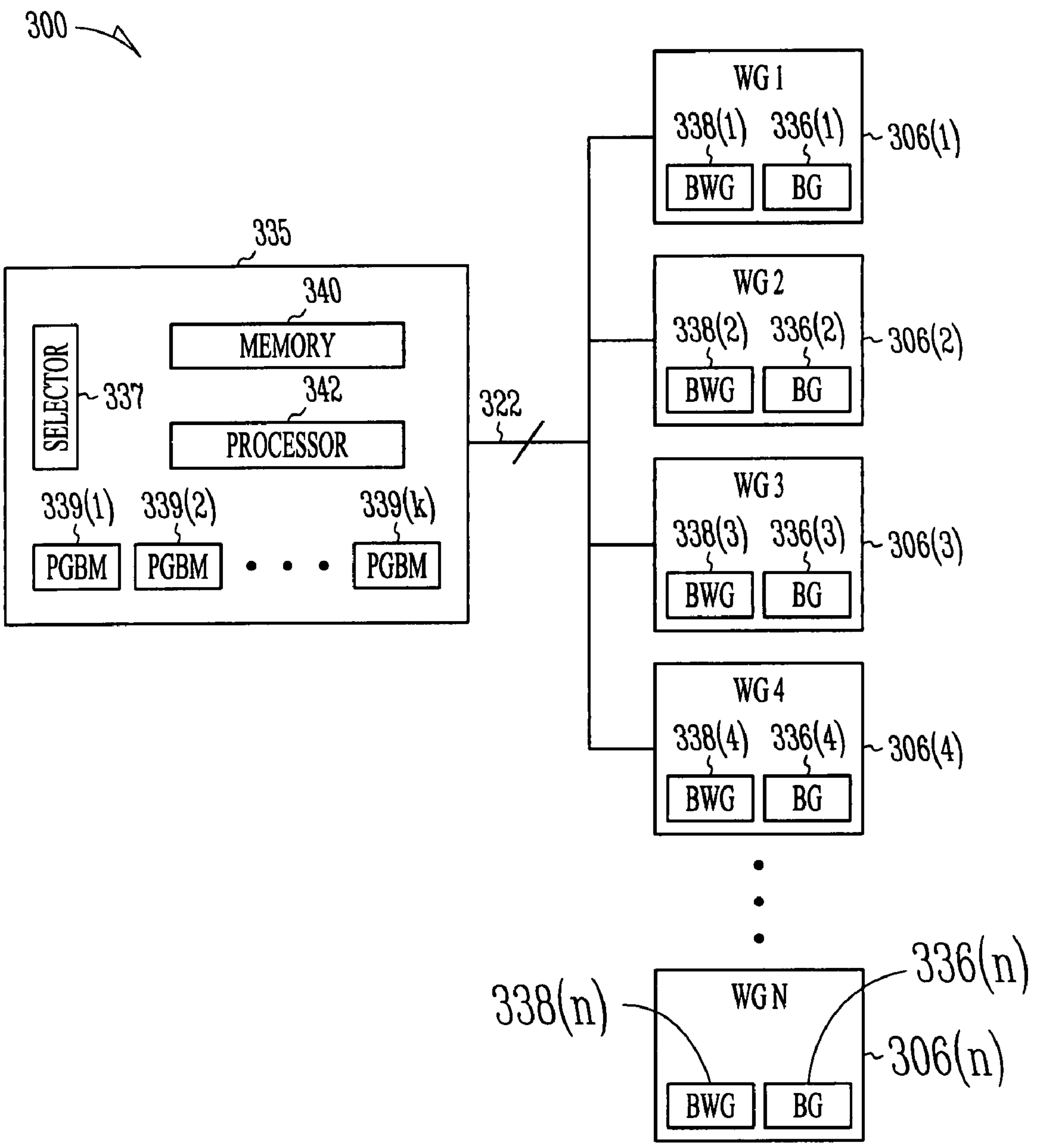
FIG. 3 is a block diagram illustrating wagering game architecture according to example embodiments of the invention.

FIG. 3 is a block diagram illustrating a wagering game architecture 300 according to an example embodiment of the invention. In this embodiment, the wagering game architecture 300 includes a plurality of wagering game machines 306(1)-306(*n*) operatively coupled to the portal module 335. The portal module 335 can include subroutine code, code libraries and application program interfaces such as interpreters utilizing Java EE™, Simple DirectMedia Layer™ (SDL) and DirectX™ for carrying out one or more functions of the portal module 335, including operation of the bonus game selector 337. The portal module 335 can also include microprocessors, application specific integrated circuits, application specific standard products, field programmable gate arrays, complex programmable logic devices, programmable read only memories, electrically erasable programmable read only memories and other programmable logic devices for carrying out one or more functions, including operation of the bonus game selector 337.

The wagering game machines 306(1)-306(*n*) can include a base wagering game module 338(1)-338(*n*) and a bonus game module 336(1)-336(*n*). Each base wagering game module 338(1)-338(*n*) and resident bonus game module 336(1)-336(*n*) can be configured for different base wagering game and/or with different bonus game content. The portal module 335 includes a plurality of portal bonus game modules 339(1)-339(*k*) configured for playing a plurality of different bonus games. The portal module 335 includes an optional memory unit 340 and an optional processor unit 342. In one embodiment, the processor unit 342 can include a random number generator. The processor can also be configured to receive data from a random number generator. The memory 340 can be configured to store values provided by the portal bonus game modules 339(1)-339(*k*), values transmitted by the wagering game machines 306(1)-306(*n*) and information received from the processor 342. The portal module 335 can be coupled to the wagering game machines 306(1)-306(*n*) using a transmission medium 322, such as a bus, a wireless link, an optical fiber, or network. The portal module 335 can be configured to receive information from the wagering game machines 306(1)-306(*n*), including the desired portal expected values corresponding to the expected value contribution of each of the resident bonus game modules 336(1)-336(*n*). In some embodiments, the payout frequencies and the average bonus game payout values for each of resident bonus game are passed to the portal module 335 to generate the desired portal expected value using the portal module 335.

The portal module 335 can pass the desired portal expected value to one of a plurality of portal bonus game modules 339(1)-339(*k*) that are in the portal module 335. The portal bonus games that can be accessed can be selected by the players of each wagering game or by the wagering game operator. The respective selected portal bonus game module can also accept the desired portal expected value from the portal module 335 and use desired portal expected value to generate pay tables corresponding to payout frequencies and/or payout values for the portal bonus games to match the desired portal expected value.

The portal module 335 can be further configured to include the bonus game selector 337, which may be configured to function in a manner similar to the selector 237. Upon triggering a bonus game, the base wagering game module can search the bonus game selector for available portal bonus games in the manner described. The base wagering game machines 306(1)-306(*n*) or the base wagering game module 338(1)-338(*n*) can search the bonus game selector 337 for one or more characteristics related to portal bonus games 339(1)-339(*k*), such as an expected value contribution, a bonus game payout frequency and/or average bonus game payout value. Based on the search, the appropriate portal bonus game can be played.

The portal module 235 and the portal module 335 illustrated in FIGS. 2 and 3 can also be configured to operate with a base wagering game without a resident bonus game. Here, the portal modules 235 and 335 can include an expected value ($EV_p$) from which an available portal bonus game expected value $EV_{BG}$ can be extracted. In an embodiment, the expected value of the base wagering game $E_{BWG}$ associated with the base wagering game module coupled to the portal modules 235, 335 is reduced by an amount equal $EV_T$-$EV_p$. The resulting $EV_p$ is the available $EV_{BG}$ and the desired expected value passed to the selected portal bonus game module.

The portal module 235 and the portal module 335 can also be configured to operate with a base wagering game with or without a resident bonus game by querying base wagering game module 238 or 338(1)-338(*n*) for a desired portal expected value. The desired portal expected value can correspond to constant value stored in a base wagering game module, pre-adjusted to match the $EV_T$ of the wagering game. Here, the a predefined expected value, $EV_{BGD}$, is the expected value available for playing a bonus game. Selection of a portal bonus game reduces $E_{BWG}$ by an amount corresponding to $EV_{BGD}$. The base wagering game modules 238 and 338(1)-338(*n*) then pass $EV_{BGD}$ to the portal modules 235, 335 where it is passed on to the selected bonus game module. Where no bonus game is selected, the base wagering game retains an expected value $E_{BWG}$=$EV_T$.

The portal module 235 and the portal module 335 can also be configured to operate with a base wagering game with or without a resident bonus game by passing to the base wagering game module 238 or 338(1)-338(*n*) an $EV_T$. The base wagering game module accepts $EV_T$ and generates an available $E_{BG}$ based on its $E_{BWG}$. The resulting $E_{BG}$ is the desired portal expected value that can be passed to the portal module 235 and the portal module 335.

Example Operation

Figure 4A:
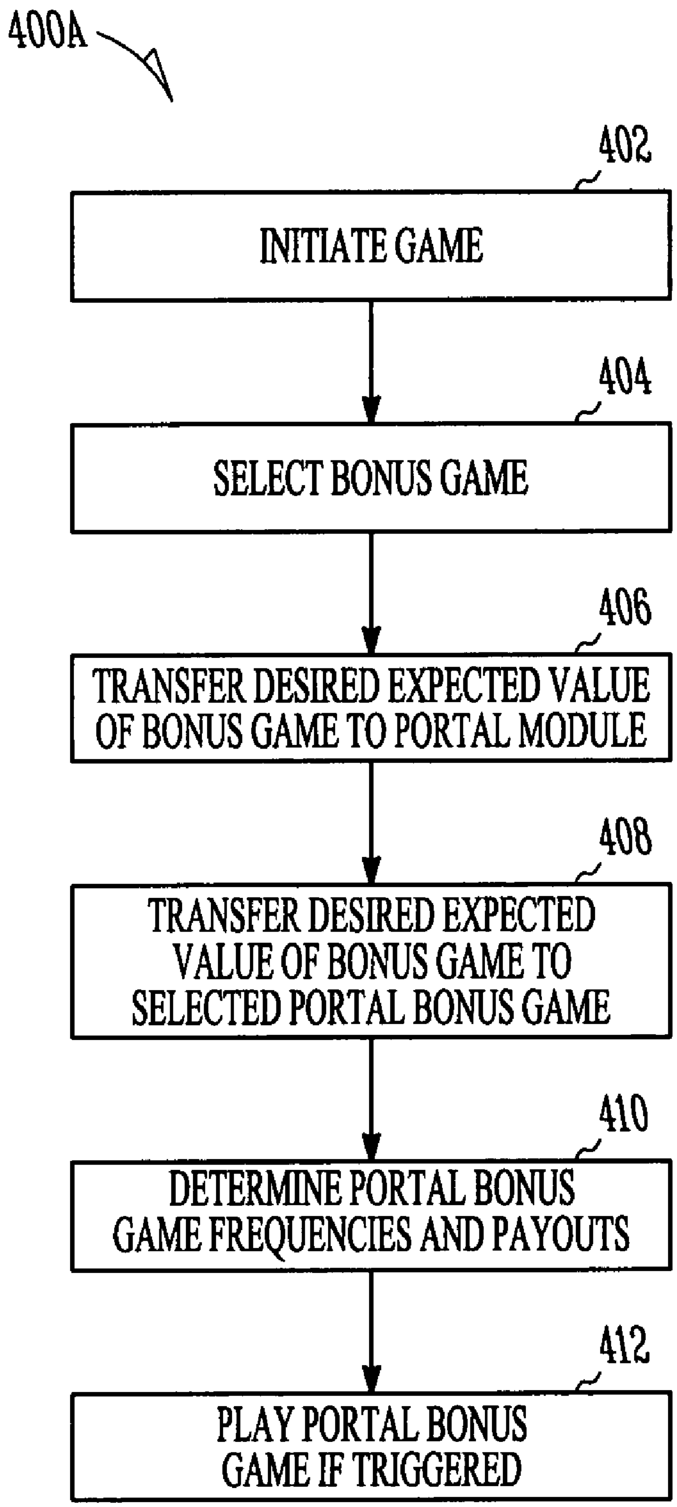
FIGS. 4A-B are flowcharts illustrating methods for paying a wagering game according to embodiments of the invention.

FIG. 4A is a flowchart illustrating a method 400A for paying a wagering game according to embodiments of the invention. The method begins at block 402 initiating game play.

At block 404 the player selects a bonus game to be played upon the triggering of a bonus play. In one embodiment, the player can choose to select no bonus games to be played. The player can accept the resident bonus game associated with the base wagering game or select a portal bonus game. In an embodiment, a predefined expected value associated with a portal module or a base wagering game, such as $EV_p$ or $EV_{BGD}$ is used rather than the resident bonus game expected value. In one embodiment, the wagering game operator can select the portal bonus game.

At block 406, if a portal bonus game is selected, the desired portal expected value is passed to a portal module where it can be further stored or used. Otherwise, the base wagering game proceeds without accessing the portal module. In an embodiment, the portal expected value is calculated by the portal module using the average bonus game frequencies and average bonus payout values passed from the base wagering game module. In various embodiments, the selected portal bonus game can be changed or removed.

At block 408, the portal expected value module passes the desired portal expected value to the selected portal bonus game, where it can be used and/or stored.

At block 410 the selected portal bonus game uses the passed desired portal expected value to determine the portal bonus game payout frequencies and the average bonus payout values necessary to match the passed desired portal expected value. The corresponding generated portal bonus game payout frequencies and the average bonus payout values can be stored in a look-up table located in a memory associated with the portal bonus game or in the portal expected value module.

At block 412, upon triggering the portal bonus game while playing the base wagering game, the portal bonus game can be played.

Example Operation

Figure 4B:
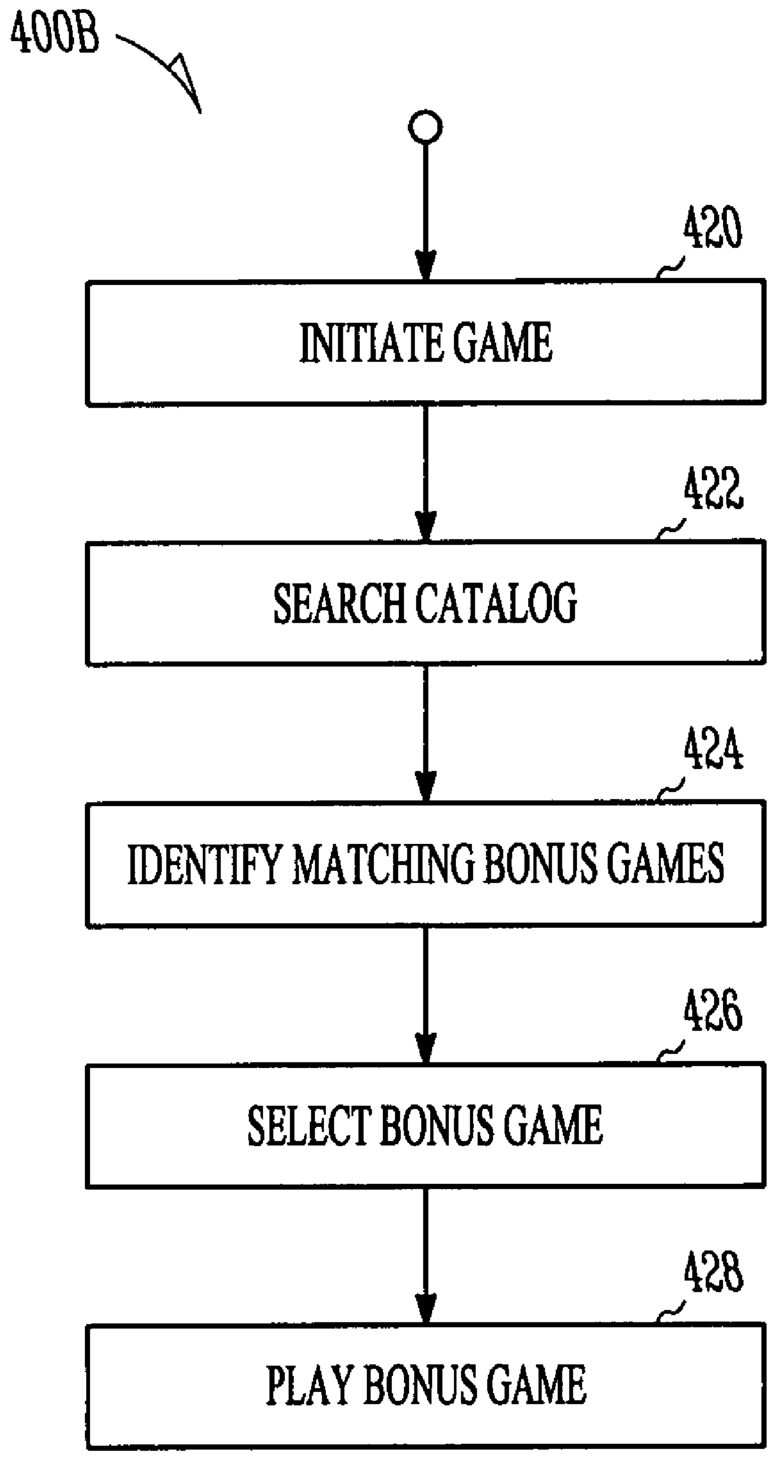

FIG. 4B is a flowchart illustrating features of an embodiment of a method 400B for regulating wagering game play according to embodiments of the invention. The method includes, at block 420 initiating game play.

At block 422, upon triggering a bonus game award, the base wagering game searches the catalog of a bonus game selector module communicatively coupled to a portal module for specified portal bonus game characteristics. In one embodiment, the base wagering game module searches the selector based on an expected value contribution such as $EV_{BG}$, or based on $EV_{BWG}$ or $EV_T$. In another embodiment, the base wagering game searches the catalog for one or more payout frequencies or one or more payout values. The portal bonus games that are available for playing can be added to the to the catalog as they are registered on a network.

At block 424, the appropriate portal bonus games are identified based on the search criteria passed to the portal module. In one embodiment, the portal passes back to the base wagering game module the portal bonus games that can be played according to the search criterion.

At block 426, the appropriate portal bonus game can be selected. In one embodiment, the appropriate portal bonus game can be selected by a player. In another embodiment, the appropriate portal bonus game can be selected by a wagering game operator. In another embodiment, a selector module can randomly select the portal bonus game from a plurality of appropriate portal bonus games.

At block 428, the desired portal expected value is passed to the selected portal game and the portal bonus game can be played.

Figure 5:
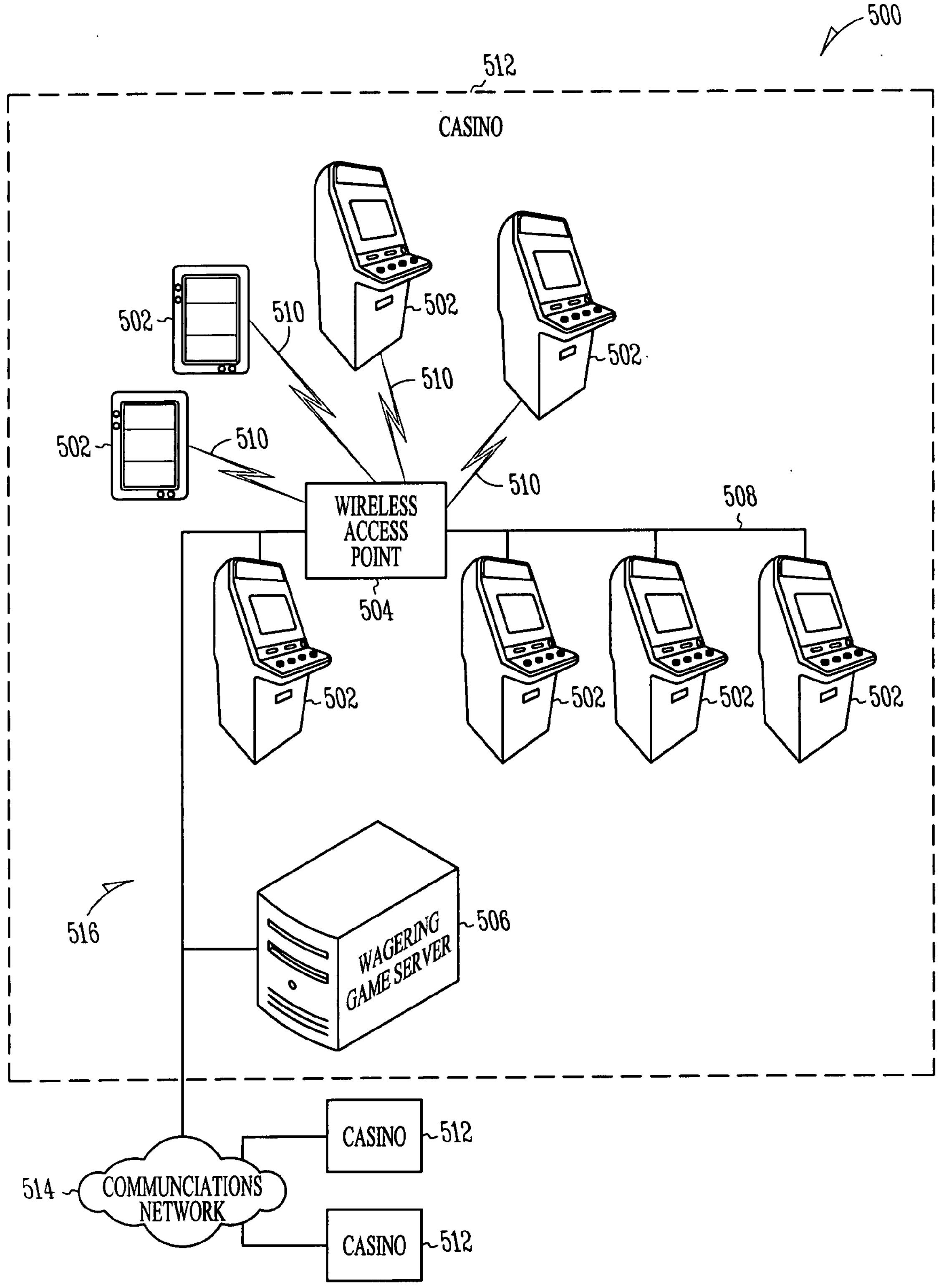
FIG. 5 is a block diagram illustrating a wagering game network according to example embodiments of the invention.

While FIGS. 1, 2 and 3 describe example embodiments of a wagering game machine architecture, FIG. 5 shows how a plurality of wagering game machines can be connected in a wagering game network.

Example Wagering Game Network

FIG. 5 is a block diagram illustrating a wagering game network, according to example embodiments of the invention. As shown in FIG. 5, the wagering game network 500 includes a plurality of casinos 512 connected to a communications network 514.

Each of the plurality of casinos 512 includes a local area network 516, which includes a wireless access point 504, wagering game machines 502, and a wagering game server 506 that can serve wagering games over the local area network 516. As such, the local area network 516 includes wireless communication links 510 and wired communication links 508. The wired and wireless communication links can employ any suitable connection technology, such as Bluetooth, 802.11, Ethernet, public switched telephone networks, SONET, etc. In one embodiment, the wagering game server 506 can serve wagering games and/or distribute content to devices located in other casinos 512 or at other locations on the communications network 514.

The wagering game machines 502 and wagering game server 506 can include hardware and machine-readable media including instructions for performing the operations described herein. The wagering game network 500 can include the portal expected value module 134/135 operable as discussed. In some embodiments, the wagering game server

506 includes the portal expected value module 134/135. In one embodiment, the wagering game server 506 is located outside the casino 512 and communicatively coupled to the communications network 514 or the wireless access point 504.

The wagering game machines 502 described herein can take any suitable form, such as floor standing models, handheld mobile units, bartop models, workstation-type console models, etc. Further, the wagering game machines 502 can be primarily dedicated for use in conducting wagering games, or can include non-dedicated devices, such as mobile phones, personal digital assistants, personal computers, etc. In one embodiment, the wagering game network 500 can include other network devices, such as accounting servers, wide area progressive servers, player tracking servers, and/or other devices suitable for use in connection with embodiments of the invention.

Example Wireless Environment

In some embodiments, the wireless access point 504 and wagering game machines 502 can communicate orthogonal frequency division multiplexed (OFDM) communication signals over a multicarrier communication channel. The multicarrier communication channel can be within a predetermined frequency spectrum and can comprise a plurality of orthogonal subcarriers. In some embodiments, the multicarrier signals can be defined by closely spaced OFDM subcarriers. Each subcarrier can have a null at substantially a center frequency of the other subcarriers and/or each subcarrier can have an integer number of cycles within a symbol period. In some embodiments, the wireless access point 504 and wagering game machines 502 can communicate in accordance with a broadband multiple access technique, such as orthogonal frequency division multiple access (OFDMA). In some embodiments, the wireless access point 504 and wagering game machines 502 can communicate using spread-spectrum signals.

In some embodiments, the wireless access point 504 can be part of a communication station, such as wireless local area network (WLAN) communication station including a Wireless Fidelity (WiFi) communication station, or a WLAN access point (AP). In these embodiments, the wagering game machines 502 can be part of a mobile station, such as WLAN mobile station or a WiFi mobile station.

In some other embodiments, the wireless access point 504 can be part of a broadband wireless access (BWA) network communication station, such as a Worldwide Interoperability for Microwave Access (WiMax) communication station, as the wireless access point 504 can be part of almost any wireless communication device. In these embodiments, the wagering game machines 502 can be part of a BWA network communication station, such as a WiMax communication station.

In some embodiments, any of the wagering game machines 502 can be part of a portable wireless communication device, such as a personal digital assistant (PDA), a laptop or portable computer with wireless communication capability, a web tablet, a wireless telephone, a wireless headset, a pager, an instant messaging device, a digital camera, a television, or other device that can receive and/or transmit information wirelessly.

In some embodiments, the frequency spectrums for the communication signals transmitted and received by the wireless access point 504 and the wagering game machines 502 can comprise either a 5 gigahertz (GHz) frequency spectrum, a 2.4 GHz frequency spectrum, or other frequency spectrum. In these embodiments, the 5 GHz frequency spectrum can include frequencies ranging from approximately 4.9 to 5.9 GHz, and the 2.4 GHz spectrum can include frequencies ranging from approximately 2.3 to 2.5 GHz, but other frequency spectrums are also equally suitable. In some BWA network embodiments, the frequency spectrum for the communication signals can comprise frequencies between 2 and 11 GHz.

In some embodiments, the wireless access point 504 and the wagering game machines 502 can communicate RF signals in accordance with specific communication standards, such as the Institute of Electrical and Electronics Engineers (IEEE) standards including IEEE 802.11(a), 802.11(b), 802.11(g), 802.11 (h) and/or 802.11(n) standards and/or proposed specifications for wireless local area networks, but they can also be suitable to transmit and/or receive communications in accordance with other techniques and standards. In some BWA network embodiments, the wireless access point 604 and the wagering game machines 502 can communicate RF signals in accordance with the IEEE 802.16-2004 and the IEEE 802.16(e) standards for wireless metropolitan area networks (WMANs) including variations and evolutions thereof. However, they can also be suitable to transmit and/or receive communications in accordance with other techniques and standards. For more information with respect to the IEEE 802.11 and IEEE 802.16 standards, please refer to "IEEE Standards for Information Technology—Telecommunications and Information Exchange between Systems"—Local Area Networks—Specific Requirements—Part 11 "Wireless LAN Medium Access Control (MAC) and Physical Layer (PHY), ISO/IEC 8802-11: 1999", and Metropolitan Area Networks—Specific Requirements—Part 16: "Air Interface for Fixed Broadband Wireless Access Systems," Can 6005 and related amendments/versions.

In some embodiments, the wireless access point 504 and the wagering game machines 502 can include one or more antennas (not shown). These antennas can comprise directional or omnidirectional antennas, including, for example, dipole antennas, monopole antennas, patch antennas, loop antennas, microstrip antennas or other types of antennas suitable for transmission of the RF signals. In some multiple-input, multiple-output (MIMO) embodiments, two or more antennas can be used. In some embodiments, instead of two or more antennas, a single antenna with multiple apertures can be used. In these multiple aperture embodiments, each aperture can be considered a separate antenna. In some multi-antenna embodiments, each antenna can be effectively separated to take advantage of spatial diversity and the different channel characteristics that can result between each of the antennas and another wireless communication device. In some multi-antenna embodiments, the antennas of a device can be separated by up to 1/10 of a wavelength or more.

In some embodiments, handoffs between different wireless access points 604 and one of the wagering game machines 502 can be performed based on a signal-to-noise ratio (SNR), a signal-to-noise and interference ratio (SNIR), a bit-error rate (BER), or an energy per received bit.

In some embodiments, the wireless access point 504 and the wagering game machines 502 can communicate in accordance with standards such as the Pan-European mobile system standard referred to as the Global System for Mobile Communications (GSM). In some embodiments, the wireless access point 504 and the wagering game machines 502 can also communicate in accordance with packet radio services such as the General Packet Radio Service (GPRS) packet data communication service. In some embodiments, the wireless access point 504 and the wagering game machines 502 can communicate in accordance with the Universal Mobile Telephone System (UMTS) for the next generation of GSM, which can, for example, implement communication techniques in accordance with 2.5G and third generation (3G) wireless standards (See 3GPP Technical Specification, Version 3.2.0, March 2000). In some of these embodiments, the wireless access point 504 and the wagering game machines 502 can provide packet data services (PDS) utilizing packet data protocols (PDP). In other embodiments, the wireless access point 504 and the wagering game machines 502 can communicate in accordance with other standards or other air-interfaces including interfaces compatible with the enhanced data for GSM evolution (EDGE) standards (see 3GPP Technical Specification, Version 3.2.0, March 2000).

In other embodiments, the wireless access point 504 and the wagering game machines 502 can communicate in accordance with a short-range wireless standard, such as the Bluetooth™ short-range digital communication protocol. Bluetooth™ wireless technology is a de facto standard, as well as a specification for small-form factor, low-cost, short-range radio links between mobile PCs, mobile phones and other portable devices. (Bluetooth is a trademark owned by Bluetooth SIG, Inc.) In other embodiments, the wireless access point 504 and the wagering game machines 502 can communicate in accordance with an ultra-wideband (UWB) communication technique where a carrier frequency is not used. In other embodiments, the wireless access point 504 and the wagering game machines 502 can communicate in accordance with an analog communication technique. In other embodiments, the wireless access point 504 and the wagering game machines 502 can communicate in accordance with an optical communication technique, such as the Infrared Data Association (IrDA) standard. In some embodiments, the wireless access point 504 and the wagering game machines 502 can communicate in accordance with the Home-RF standard which can be in accordance with a Home-RF Working Group (HRFWG) standard.

Example Wagering Game Machine

Figure 6:
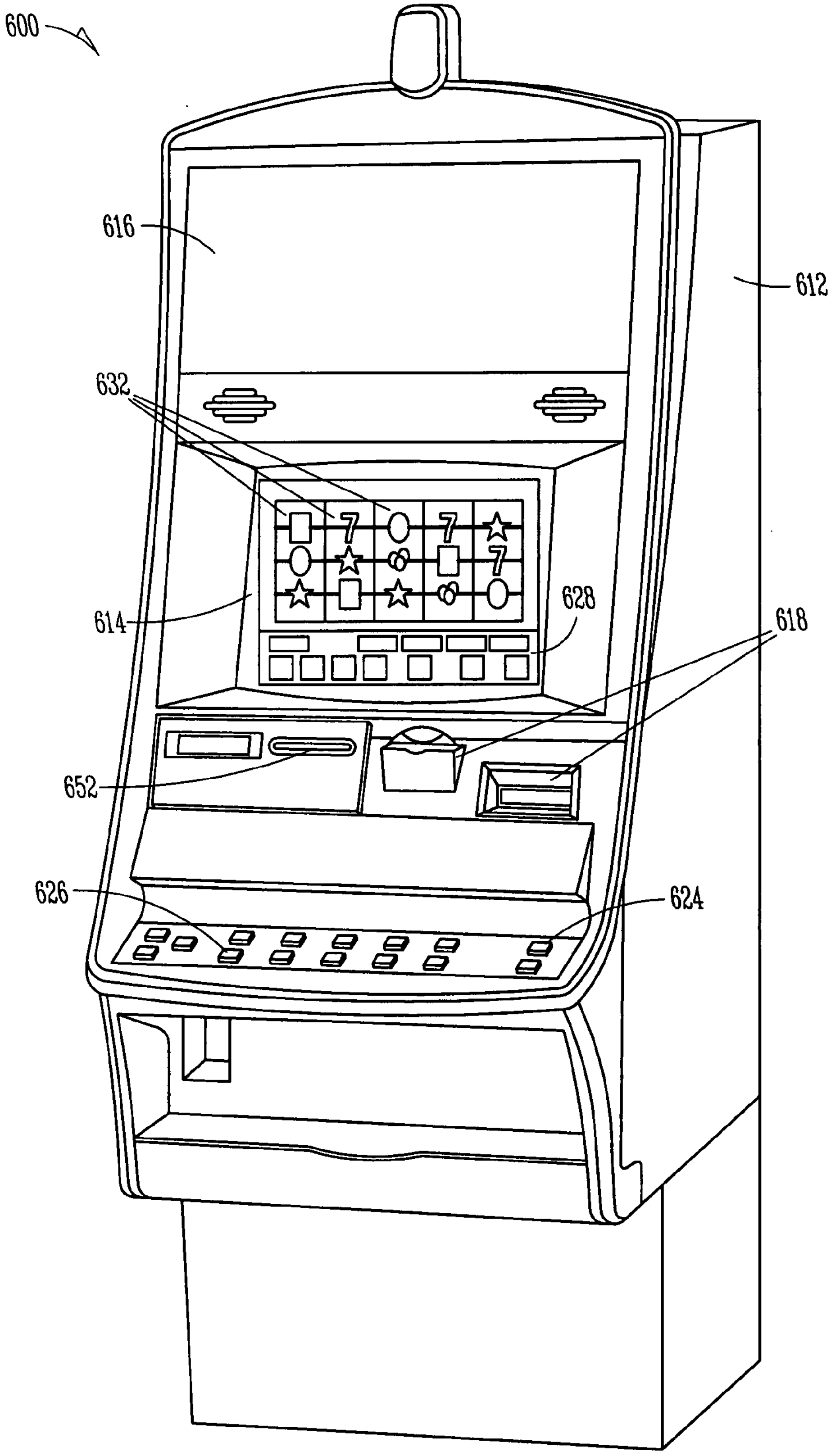
FIG. 6 is a perspective view of a wagering game machine according to example embodiments of the invention.

FIG. 6 is a perspective view of a wagering game machine, according to example embodiments of the invention. Referring to FIG. 6, a wagering game machine 600 is used in gaming establishments, such as casinos. According to embodiments, the wagering game machine 600 can be any type of wagering game machine and can have varying structures and methods of operation. For example, the wagering game machine 600 can be an electromechanical wagering game machine configured to play mechanical slots, or it can be an electronic wagering game machine configured to play video casino games, such as blackjack, slots, keno, poker, blackjack, roulette, or video role playing games with wagering content, etc.

The wagering game machine 600 comprises a housing 612 and includes input devices, including value input devices 618 and a player input device 624. For output, the wagering game machine 600 includes a primary display 614 for displaying information about a basic wagering game. The primary display 614 can also display information about a bonus wagering game and a progressive wagering game. The wagering game machine 600 also includes a secondary display 616 for displaying wagering game events, wagering game outcomes, and/or signage information. While some components of the wagering game machine 600 are described herein, numerous other elements can exist and can be used in any number or combination to create varying forms of the wagering game machine 600.

The value input devices 618 can take any suitable form and can be located on the front of the housing 612. The value input devices 618 can receive currency and/or credits inserted by a player. The value input devices 618 can include coin acceptors for receiving coin currency and bill acceptors for receiving paper currency. Furthermore, the value input devices 618 can include ticket readers or barcode scanners for reading information stored on vouchers, cards, or other tangible portable storage devices. The vouchers or cards can authorize access to central accounts, which can transfer money to the wagering game machine 600.

The player input device 624 comprises a plurality of push buttons on a button panel 626 for operating the wagering game machine 600. In addition, or alternatively, the player input device 624 can comprise a touch screen 628 mounted over the primary display 614 and/or secondary display 616.

The various components of the wagering game machine 600 can be connected directly to, or contained within, the housing 612. Alternatively, some of the wagering game machine's components can be located outside of the housing 612, while being communicatively coupled with the wagering game machine 600 using any suitable wired or wireless communication technology.

The operation of the basic wagering game can be displayed to the player on the primary display 614. The primary display 614 can also display a bonus game associated with the basic wagering game. The primary display 614 can include a cathode ray tube (CRT), a high resolution liquid crystal display (LCD), a plasma display, light emitting diodes (LEDs), or any other type of display suitable for use in the wagering game machine 600. Alternatively, the primary display 614 can include a number of mechanical reels to display the outcome. In FIG. 6, the wagering game machine 600 is an "upright" version in which the primary display 614 is oriented vertically relative to the player. Alternatively, the wagering game machine can be a "slant-top" version in which the primary display 614 is slanted at about a thirty-degree angle toward the player of the wagering game machine 600. In yet another embodiment, the wagering game machine 600 can exhibit any suitable form factor, such as a free standing model, bartop model, mobile handheld model, or workstation console model.

A player begins playing a basic wagering game by making a wager via the value input device 618. The player can initiate play by using the player input device's buttons or touch screen 628. The basic game can include arranging a plurality of symbols along a pay line 632, which indicates one or more outcomes of the basic game. Such outcomes can be randomly selected in response to player input. At least one of the outcomes, which can include any variation or combination of symbols, can trigger a bonus game.

In some embodiments, the wagering game machine 600 can also include an information reader 652, which can include a card reader, ticket reader, bar code scanner, RFID transceiver, or computer readable storage medium interface. In some embodiments, the information reader 652 can be used to award complimentary services, restore game assets, track player habits, etc.

Example Wagering Game Machine

Figure 7:
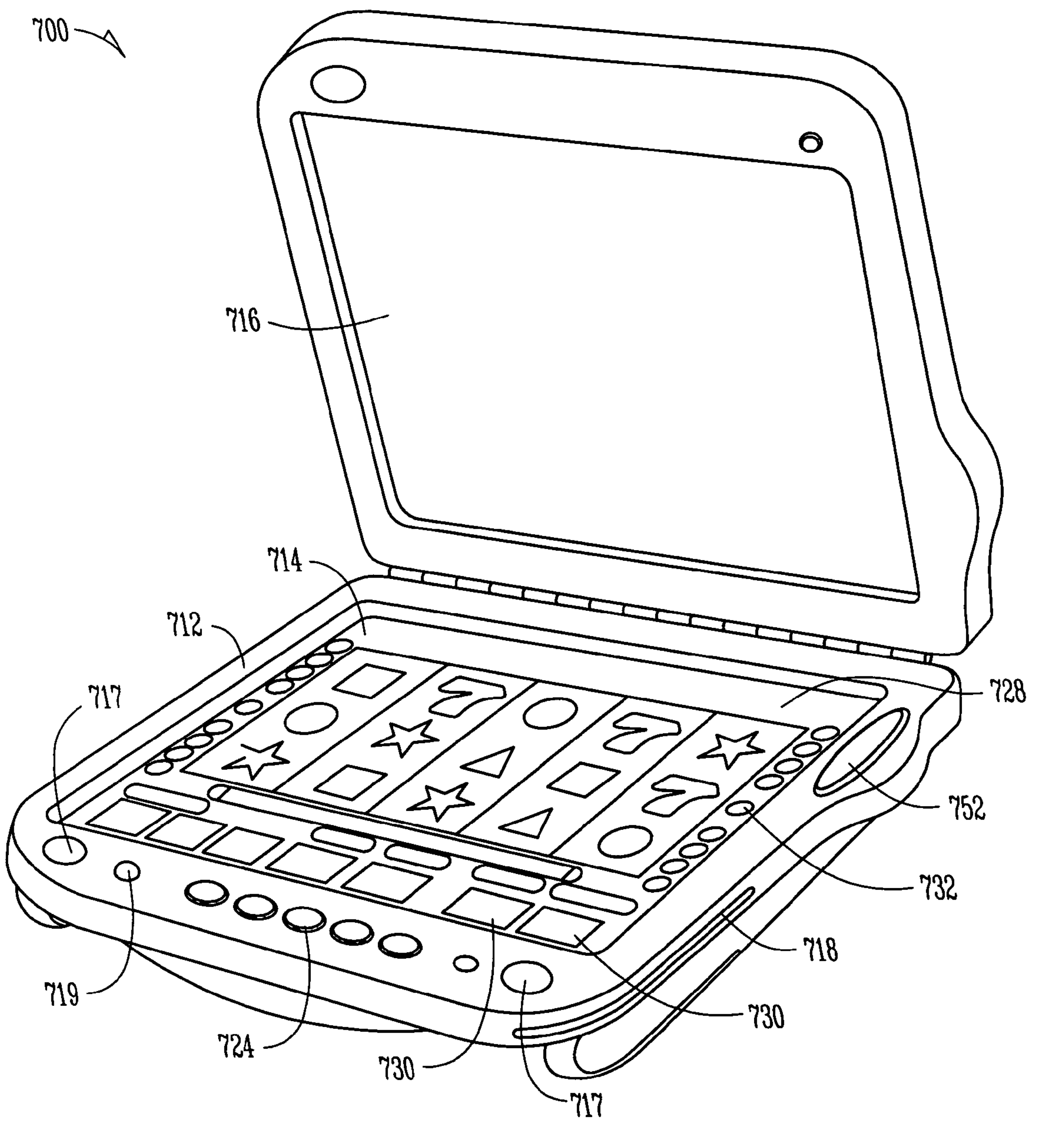
FIG. 7 is a perspective view of an example embodiment of a wagering game machine.

FIG. 7 shows an example embodiment of a wagering game machine 710. Like free standing wagering game machines, in a handheld or mobile form, the wagering game machine 710 can include any suitable electronic device configured to play a video casino games such as blackjack, slots, keno, poker, blackjack, roulette, and video role playing games with wagering content. The wagering game machine 710 comprises a housing 712 and includes input devices, including a value input device 718 and a player input device 724. For output, the wagering game machine 710 includes a primary display 714, a secondary display 716, one or more speakers 717, one or more player-accessible ports 719 (e.g., an audio output jack for headphones, a video headset jack, etc.), and other conventional I/O devices and ports, which may or may not be player-accessible. In the embodiment depicted in FIG. 7, the wagering game machine 710 comprises a secondary display 716 that is rotatable relative to the primary display 714. The optional secondary display 716 can be fixed, movable, and/or detachable/attachable relative to the primary display 714. Either the primary display 714 and/or secondary display 716 can be configured to display any aspect of a non-wagering game, wagering game, secondary game, bonus game, progressive wagering game, group game, shared-experience game or event, game event, game outcome, scrolling information, text messaging, emails, alerts or announcements, broadcast information, subscription information, and wagering game machine status.

The player-accessible value input device 718 can comprise, for example, a slot located on the front, side, or top of the casing 712 configured to receive credit from a stored-value card (e.g., casino card, smart card, debit card, credit card, etc.) inserted by a player. The player-accessible value input device 718 can also comprise a sensor (e.g., an RF sensor) configured to sense a signal (e.g., an RF signal) output by a transmitter (e.g., an RF transmitter) carried by a player. The player-accessible value input device 718 can also, or alternatively, include a ticket reader or barcode scanner for reading information stored on a credit ticket, a card, or other tangible portable credit or funds storage device. The credit ticket or card can also authorize access to a central account, which can transfer money to the wagering game machine 710.

Still other player-accessible value input devices 718 can use touch keys 730 on the touch-screen display (e.g., primary display 714 and/or secondary display 716) or player input devices 724. Upon entry of player identification information and, preferably, secondary authorization information (e.g., a password, PIN number, stored value card number, predefined key sequences, etc.), the player can be permitted to access a player's account. As one potential optional security feature, the wagering game machine 710 can be configured to permit a player to only access an account the player has specifically set up for the wagering game machine 710. Other conventional security features can also be utilized to, for example, prevent unauthorized access to a player's account, to minimize an impact of any unauthorized access to a player's account, or to prevent unauthorized access to any personal information or funds temporarily stored on the wagering game machine 710.

The player-accessible value input device 718 can itself comprise or utilize a biometric player information reader which permits the player to access available funds on a player's account, either alone or in combination with another of the aforementioned player-accessible value input devices 718. In an embodiment wherein the player-accessible value input device 718 comprises a biometric player information reader, transactions such as an input of value to the wagering game machine 710, a transfer of value from one player account or source to an account associated with the wagering game machine 710, or the execution of another transaction, for example, could all be authorized by a biometric reading, which could comprise a plurality of biometric readings, from the biometric device.

Alternatively, to enhance security, a transaction can be optionally enabled only by a two-step process in which a secondary source confirms the identity indicated by a primary source. For example, a player-accessible value input device 718 comprising a biometric player information reader can require a confirmatory entry from another biometric player information reader 752, or from another source, such as a credit card, debit card, player ID card, fob key, PIN number, password, hotel room key, etc. Thus, a transaction can be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another embodiment, the value input device 718 can be provided remotely from the wagering game machine 710.

The player input device 724 comprises a plurality of push buttons on a button panel for operating the wagering game machine 710. In addition, or alternatively, the player input device 724 can comprise a touch screen mounted to a primary display 714 and/or secondary display 716. In one embodiment, the touch screen is matched to a display screen having one or more selectable touch keys 730 selectable by a user's touching of the associated area of the screen using a finger or a tool, such as a stylus pointer. A player enables a desired function either by touching the touch screen at an appropriate touch key 730 or by pressing an appropriate push button on the button panel. The touch keys 730 can be used to implement the same functions as push buttons. Alternatively, the push buttons 726 can provide inputs for one feature of the operating the game, while the touch keys 730 can allow for input needed for another feature of the game. The various components of the wagering game machine 710 can be connected directly to, or contained within, the casing 712, as seen in FIG. 4, or can be located outside the casing 712 and connected to the casing 712 via a variety of wired (tethered) or wireless connection methods. Thus, the wagering game machine 710 can comprise a single unit or a plurality of interconnected (e.g., wireless connections) parts which can be arranged to suit a player's preferences.

The operation of the basic wagering game on the wagering game machine 710 is displayed to the player on the primary display 714. The primary display 714 can also display the bonus game associated with the basic wagering game. The primary display 714 preferably takes the form of a high resolution LCD, a plasma display, an LED, or any other type of display suitable for use in the wagering game machine 710. The size of the primary display 714 can vary from, for example, about a 2-3" display to a 15" or 17" display. In at least some embodiments, the primary display 714 is a 7"-10" display. In one embodiment, the size of the primary display can be increased. Optionally, coatings or removable films or sheets can be applied to the display to provide desired characteristics (e.g., anti-scratch, anti-glare, bacterially-resistant and anti-microbial films, etc.). In at least some embodiments, the primary display 714 and/or secondary display 716 can have a 16:9 aspect ratio or other aspect ratio (e.g., 4:3). The primary display 714 and/or secondary display 716 can also each have different resolutions, different color schemes, and different aspect ratios.

As with the free standing embodiments a wagering gaming machine, a player begins play of the basic wagering game on the wagering game machine 710 by making a wager (e.g., via the value input device 718 or an assignment of credits stored on the handheld gaming machine via the touch screen keys 730, player input device 724, or buttons 726) on the wagering game machine 710. In some embodiments, the basic game can comprise a plurality of symbols arranged in an array, and includes at least one pay line 732 that indicates one or more outcomes of the basic game. Such outcomes can be randomly selected in response to the wagering input by the player. At least one of the plurality of randomly selected outcomes can be a start-bonus outcome, which can include any variations of symbols or symbol combinations triggering a bonus game.

In some embodiments, the player-accessible value input device 718 of the wagering game machine 710 can double as a player information reader 752 that allows for identification of a player by reading a card with information indicating the player's identity (e.g., reading a player's credit card, player ID card, smart card, etc.). The player information reader 752 can alternatively or also comprise a bar code scanner, RFID transceiver or computer readable storage medium interface. In one embodiment, the player information reader 752 comprises a biometric sensing device.

In the above detailed description, reference is made to specific examples by way of drawings and illustrations. These examples are described in sufficient detail to enable those skilled in the art to practice the inventive subject matter, and serve to illustrate how the inventive subject matter may be applied to various purposes or embodiments. Other embodiments are included within the inventive subject matter, as logical, mechanical, electrical, and other changes can be made to the example embodiments described herein. The various embodiments are not necessarily mutually exclusive, as some embodiments can be combined with one or more embodiments to form new embodiments. Features or limitations of various embodiments described herein do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter.

What is claimed is:

1. A portal apparatus for generating one or more bonus games for combined play with a base game in a combined wagering game, the one or more bonus games being associated with one or more bonus game modules that include bonus game data for generating outcomes of the one or more bonus games, the base game associated with one or more base game modules, the combined wagering game having a combined expected value, the apparatus comprising:

one or more portal processors;

at least one memory device;

a portal module stored on the at least one memory device that, when executed by the one or more portal processors, causes the one or more portal processors to operate with the one or more bonus game modules and the one or more base game modules to:

receive, prior to play of the base game, the base game expected value of the base game, wherein the base game expected value is a theoretical value that the base game will award, on average, over an extended number of base games;

generate at least one desired bonus game expected value, based on the received base game expected value, wherein the at least one desired bonus game expected value is a theoretical value that a bonus game will award, on average, over an extended number of bonus games; and generate, by applying at least some of the bonus game data to the at least one desired bonus game expected value, one or more compatible bonus games having the at least one desired bonus game expected value, wherein the one or more compatible bonus games produce the combined expected value of the combined wagering game when played in response to an event occurring in the base game.

2. The apparatus of claim 1, wherein the base game expected value is from a player-selected base game.

3. The apparatus of claim 1, wherein the bonus game data is based on a player selection of bonus game characteristics.

4. The apparatus of claim 1, wherein the bonus game data is based on a wagering game operator selection of bonus games or bonus game characteristics.

5. The apparatus of claim 1, wherein the at least one desired bonus game expected value is derived from payout frequencies and average payout values associated with the one or more bonus games.

6. The apparatus of claim 1, wherein the portal module is further configured to cause the one or more bonus game modules to generate at least one of payout frequencies and average payouts associated with the one or more bonus games.

7. The apparatus of claim 1, wherein the instructions cause the one or more portal processors to pass the bonus game expected value to the one or more bonus game modules to generate the one or more bonus games.

8. The apparatus of claim 1, wherein the one or more portal processors operatively couple the one or more base wagering game modules with the one or more bonus game modules to play the one or more bonus games in response to an event occurring in the base game.

9. The apparatus of claim 8, wherein the one or more portal processors are separate from a gaming machine at which the base game is played.

10. A gaming system for playing a combined wagering game including a base game and one or more bonus games, the combined wagering game having a combined expected value, the system comprising:

one or more base game modules including base game data for generating outcomes of at least one base game;

one or more bonus game modules including bonus game data for generating outcomes of one or more bonus games;

at least one portal module connected to one or more processors and connected for communication to the one or more base game modules and the one or more bonus game modules, and one or more memory devices storing instructions that, when executed by the one or more processors, cause the portal module to operate with the one or more base game modules and the one or more bonus game modules to:

pass, prior to play of the at least one base game, the base game expected value of the at least one base game to the at least one portal module, wherein the base game expected value is a theoretical value that the base game will award, on average, over an extended number of base games;

generate, based on the received base game expected value, at least one desired bonus game expected value, wherein the at least one bonus game expected value is a theoretical value that a bonus game will award, on average, over an extended number of bonus games;

generate, by applying at least some of the bonus game data to the at least one desired bonus game expected value, one or more compatible bonus games having the at least one desired bonus game expected value, wherein the one or more compatible bonus games produce the combined expected value of the combined wagering game when played in response to an event occurring in the at least one base game; and provide the at least one base game and the one or more bonus games for display on at least one wagering game machine.

11. The gaming system of claim 10, wherein the portal module is connected to one of the one or more processors, the one or more base game modules, and the one or more bonus game modules, via a communications network.

12. The gaming system of claim 11, wherein the portal module is part of a network server.

13. The gaming system of claim 10, wherein the base game expected value is from a player-selected base game.

14. The gaming system of claim 10, wherein the bonus game data is based on a player selection of bonus game characteristics.

15. The gaming system of claim 10, wherein the bonus game data is based on a wagering game operator selection of bonus games or bonus game characteristics.

16. The gaming system of claim 10, wherein the at least one desired bonus game expected value is derived from payout frequencies and average payout values associated with the one or more bonus games.

17. The gaming system of claim 10, wherein the portal module causes the one or more bonus game modules to generate at least one of payout frequencies and average payouts associated with the one or more bonus games.

18. A machine-readable, non-transitory medium having executable instructions that, when executed by one or more processors connected to a portal module, cause the portal module to generate one or more bonus games for combined play with a base game in combined wagering game, the combined wagering game having a combined expected value, the portal module performing a method comprising:

receiving, prior to play of at least one base game, the base game expected value of the at least one base game, the base game expected value being received from one or more base game modules, wherein the base game expected value is a theoretical value that the at least one base game will award, on average, over an extended number of base games;

generating, via the one or more processors and based on the received base game expected value, at least one desired bonus game expected value, wherein the at least one desired bonus game expected value is a theoretical value that a bonus game will award, on average, over an extended number of bonus games;

generating, via the one or more processors applying at least some of the bonus game data to the at least one desired bonus game expected value, one or more compatible bonus games having the at least one desired bonus game expected value, wherein the one or more compatible bonus games produce the combined expected value of the combined wagering game when played in response to an event occurring in the at least one base game; and providing the at least one base game and the one or more bonus games for display on at least one wagering game machine.

19. The machine-readable medium of claim 18, wherein the instructions reside on a network server connected for communication with at least one of the one or more processors, the at least one gaming machine, the one or more base game modules, and the one or more bonus game modules, via a communications network.

20. The machine-readable medium of claim 18, wherein the base game expected value is from a player-selected base game.

21. The machine-readable medium of claim 18, wherein the bonus game data is based on a player selection of bonus game characteristics.

22. The machine-readable medium of claim 18, wherein the bonus game data is based on a wagering game operator selection of bonus games or bonus game characteristics.

23. The machine-readable medium of claim 18, wherein the at least one desired bonus expected value is derived from payout frequencies and average payout values associated with the one or more bonus games.

* * * * *

UNITED STATES PATENT AND TRADEMARK OFFICE

CERTIFICATE OF CORRECTION

PATENT NO. : 8,202,158 B2
APPLICATION NO. : 12/514426
DATED : June 19, 2012
INVENTOR(S) : Anderson et al.

It is certified that error appears in the above-identified patent and that said Letters Patent is hereby corrected as shown below:

On face page 2, in column 2, under "Other Publication", line 25, after "12/514,421", insert --,--, therefor.

On face page 2, in column 2, under "Other Publication", line 32, delete "Pgs", and insert --pgs--, therefor.

On face page 3, in column 1, under "Other Publication", line 8, after "mailed", delete "mailed", therefor.

On face page 3, in column 1, under "Other Publication", line 23, after "PCT/US2007/023753", insert --,--, therefor.

On face page 3, in column 1, under "Other Publication", line 25, after "PCT/US2007/023753", insert --,--, therefor.

On face page 3, in column 1, under "Other Publication", line 29, delete "12/513,974 ,", and insert --12/513,974,--, therefor.

On page 3, in column 2, under "Other Publication", line 3, delete "12/513,994 ,", and insert --12/513,994,--, therefor.

On face page 3, in column 2, under "Other Publication", line 9, delete "12/514,038 ,", and insert --12/514,038,--, therefor.

On face page 3, in column 2, under "Other Publication", line 11, delete "Mailed", and insert --mailed--, therefor.

On page 3, in column 2, under "Other Publication", line 21, delete "12/514,421.", and insert --12/514,421,--, therefor.

Signed and Sealed this
Twentieth Day of November, 2012

David J. Kappos
*Director of the United States Patent and Trademark Office*

On face page 3, under “Other Publication”, in column 2, line 24, delete “Mailed”, and insert --mailed--, therefor.

On face page 3, under “Other Publication”, in column 2, line 27, delete “Examiner’s”, and insert --Examiner--, therefor.

On Sheet 6 of 8, in Figure 5, block 514, delete “COMMUNCIATIONS”, and insert --COMMUNICATIONS--, therefor.

In column 11, line 52, before “roulette”, delete “blackjack,”, therefor.

In column 12, line 67, before “roulette”, delete “blackjack,”, therefor.